G. M. EATON.
ELECTRIC LOCOMOTIVE.
APPLICATION FILED FEB. 21, 1911.
1,155,225.
Patented Sept. 28, 1915.
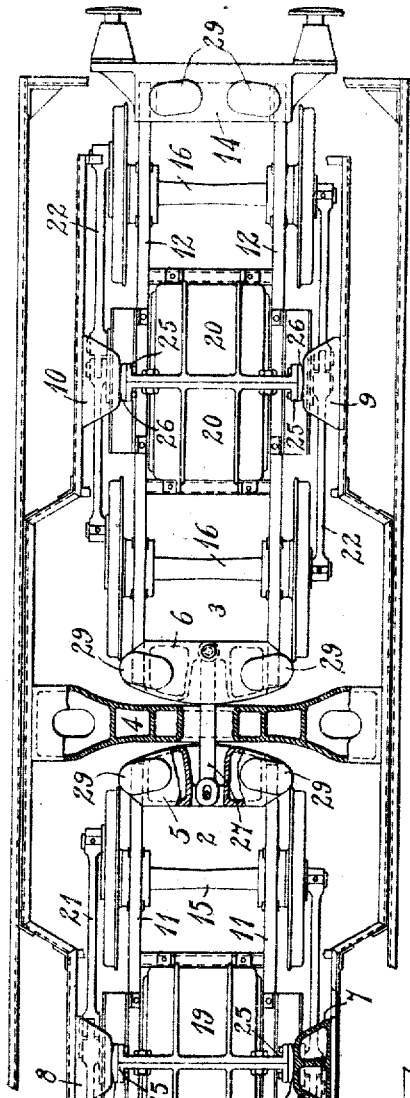
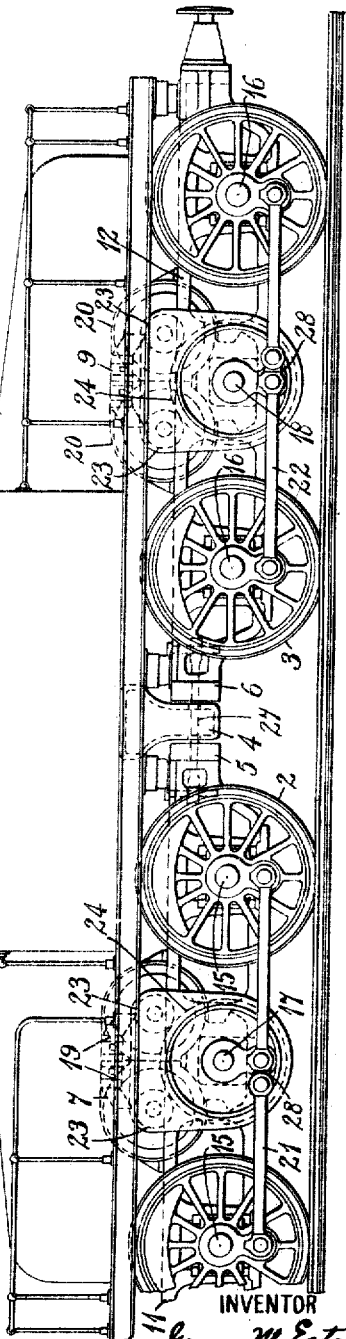
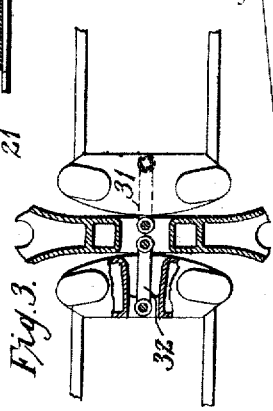
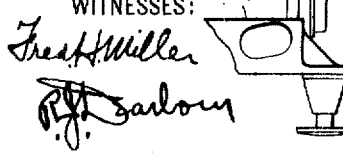

UNITED STATES PATENT OFFICE.

GEORGE M. EATON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

1,155,225.  Specification of Letters Patent.  Patented Sept. 28, 1915.

Application filed February 21, 1911. Serial No. 609,946.

*To all whom it may concern:*

Be it known that I, GEORGE M. EATON, a citizen of the United States, and a resident of Wilkinsburg, in the county of Allegheny and State of Pennsylvania, have invented a new and useful Improvement in Electric Locomotives, of which the following is a specification.

My invention relates to railway vehicles and particularly to electric locomotives having articulated trucks.

The object of my invention is to provide a locomotive of the above-indicated character that shall possess a number of distinctive and particularly advantageous features, as follows: a centrally located cross tie or bolster depending from the locomotive cab between the adjacent bumpers of the trucks; a link connection between the two trucks which may extend through the central cross tie; electric driving motors centrally located with respect to the trucks on which they are mounted, and means for restraining each truck in its central lateral plane, whereby the necessity for the usual truck center and king pin structure is avoided.

Articulated truck locomotives, as heretofore constructed, comprise one truck, the center of which is fixed relative to the locomotive cab, in the usual manner, and another truck which is free to adjust itself longitudinally of the cab, the two trucks being connected to each other by a suitable link or draw bar and the cab being driven entirely through the fixed center of the first-named truck. The structure of the body bolster, as well as that of the truck bolster, is necessarily massive and, by reason of its location, the center of the truck occupies a space which should logically be occupied by the motors and, in any event, interferes with the accessibility of the motors.

By locating a heavy cross tie at the center of the cab, I not only obtain a very desirable and symmetrical arrangement but enable the driving motors to be located centrally of the truck, thereby improving the operating characteristics of the locomotive and adapting it for very high-speed service.

Figure 1 of the accompanying drawings is a partially sectional plan view, with the cab roof removed, and Fig. 2 is a side elevation of an electric locomotive constructed in accordance with my invention. Fig. 3 is a fragmentary view of a modified link connection between trucks, which may be substituted for that shown in Fig. 1.

Referring to Figs. 1 and 2 of the drawings, the locomotive here shown comprises a cab or body 1 and a pair of similar articulated trucks 2 and 3. The cab is provided with a centrally located cross tie or bolster 4 which extends materially below the floor frame of the cab between the adjacent bumper bolsters 5 and 6 of the trucks 2 and 3 to effect a driving connection between the trucks and the cab. The cab is also provided with a plurality of blocks 7, 8, 9 and 10 which project inwardly from its under framing in the central lateral plane of the trucks, as shown in Fig. 1 of the drawings.

The trucks comprise side frames 11 and 12, the adjacent bumper girders 5 and 6, end bumper girders 13 and 14, wheel axles 15 and 16, counter-shafts 17 and 18, electric driving motors 19 and 20 and side rods 21 and 22 which form operative connections between the counter-shafts of the respective trucks and their wheel axles.

The electric motors are arranged in groups of two, each group being secured to a truck frame directly above the counter-shaft to which the motor armatures are connected by pinions 23 and a gear wheel 24. The motors are thus centrally located relative to the trucks and project upwardly into the cab between the blocks 7 and 8 or 9 and 10, as the case may be. Each group of motors is provided with lugs 25 having shoes 26 which are adapted to engage the blocks 7 and 8 or the blocks 9 and 10. These coöperating parts laterally restrain the movement of the truck in its central lateral plane and, since the truck is restrained in its central longitudinal plane by the central cross tie 4 of the cab and by a connecting link 27, the usual truck center structure is unnecessary. The lugs 25 may, of course, be a part of the truck frame instead of a part of the motor frame, and the shoes 26 may be secured to the blocks 7, 8, 9 and 10, instead of to the lugs, within the scope of my invention.

A knuckle joint 28 is provided in each of the side rods 21 and 22 in order to permit the usual adjustment of the wheel axles relative to the truck frames, the counter-shaft 17 being held in bearings which are stationary relative to the truck frame. The motors are, by this means, spring supported and they are particularly well located for high-speed operation.

The cab or body 1 is mounted, in any suitable manner, upon the trucks 2 and 3, supports being indicated at points 29 on the respective ends of the bumper girders. The link or draw-bar 27 is connected to the truck 2 by a lost-motion connection, as shown in Fig. 1, in order to make it impossible to compress the link when the locomotive is pushing or bumping the train. The cab or body is operatively connected to the trucks by means of the cross tie 4, and bumper bolsters 5 and 6 and all of the drawing and bumping strains come on the truck frames and bumpers.

As shown in Fig. 3, a pair of links 31 and 32 may be substituted for the link 27 by pivoting their adjacent ends on the central cross tie and making them sufficiently strong to take both drawing and bumping strains. In case the double link structure is used, there will be no lost motion between the outer ends of the links and the trucks to which they are pivotally connected. The two link arrangement has the advantage of resisting a well known crowning action which might otherwise be objectionable if the locomotive were used as a helper for pushing service.

The central arrangement of the cross tie 4 permits the use of interchangeable trucks, and the motors may be easily overhauled by either jacking up the end of the cab and running one of the trucks out, or by removing one of the hoods 30 which form parts of the cab and lifting the motor out by means of a crane.

Each of the trucks is provided with a well known form of truck-centering device (not shown), and various accessories, which form no part of my present invention, may, of course, be supplied as desired.

I desire that modifications which do not depart from the spirit of my invention shall be included in its scope and that only such limitations shall be imposed as are indicated in the appended claims.

I claim as my invention:

1. A vehicle comprising a cab or body having a downwardly projecting cross tie or bolster intermediate its ends and trucks located at the respective sides of the cross tie for driving the cab or body therethrough.

2. An electric vehicle comprising a cab or body having a downwardly projecting cross tie or bolster intermediate its ends, motor trucks located at the respective sides of the cross tie or bolster for driving the cab or body therethrough, and a link connection between the trucks.

3. An electric vehicle comprising a cab or body having a downwardly projecting cross tie or bolster intermediate its ends, and motor trucks located at the respective sides of the cross tie or bolster for driving the cab or body therethrough, and a draw-bar interposed between the trucks and connected to one of them by a lost-motion connection.

4. In an articulated truck locomotive, the combination with a cab or body having a centrally located cross tie or bolster projecting downwardly between the adjacent truck bumpers, and means for laterally restraining each truck in substantially its central plane.

5. A vehicle comprising a body frame and a truck adapted for relative longitudinal movement and having a centrally located driving motor projecting upwardly through the body frame, a driving connection between the truck frame and the body frame and means for laterally restraining the truck in substantially its central lateral plane.

6. An electric locomotive comprising a body frame and a truck having centrally located driving motors projecting upwardly through the body frame, a driving connection between the truck frame and the body frame, said frames being provided with co-operating guide members which permit a swiveling action of the truck and maintain a predetermined relation between the truck and the body frame.

7. A vehicle comprising a cab or body having a downwardly projecting cross tie or bolster intermediate its ends and trucks located at the respective sides of the cross tie for driving the cab or body therethrough, each truck being provided with a centrally located driving motor projecting upwardly into the cab or body and the body being provided with means for laterally restraining the truck in substantially its central lateral plane.

8. An electric vehicle comprising a cab or body having a downwardly projecting cross tie or bolster intermediate its ends, motor trucks located at the respective sides of the cross tie or bolster for driving the cab or body therethrough, a link connection interposed between the trucks and driving motors and centrally located on the trucks and projecting upwardly into the body, and co-operating projections and guide members respectively located on the trucks and on the body for laterally restraining each truck in substantially its central lateral plane.

9. A vehicle comprising a body frame and a truck adapted for relative longitudinal movement and having a centrally located driving motor projecting upwardly through the body frame, a direct driving connection between the truck frame and the body frame and means for laterally restraining the truck in substantially its central lateral plane.

10. The vehicle comprising a body frame and a truck adapted for relative longitudinal movement and having a centrally located electric driving motor projecting upwardly through the body frame, a driving connection between the truck frame and the body frame and rigid means for laterally restraining the truck in substantially its central lateral plane.

11. In a vehicle, the combination with a body and a driving truck, of means for permitting pivotal movement of said truck, and means independent of said pivotal means for transmitting the entire driving effort to said body.

12. In a vehicle, the combination with a body and a driving truck, of pivotal connections between said truck and said body, and means independent of said connections for transmitting the entire driving effort of said truck and body.

13. In a vehicle, the combination with a body and a plurality of trucks therefor, of means associated with said body for preventing lateral movements only of said trucks and other means associated with said body for preventing longitudinal movement thereof.

14. In a vehicle, the combination with a body, and a plurality of trucks, of means intermediate said trucks and coöperating therewith for determining the relative longitudinal position of said body and said trucks.

15. In a vehicle, the combination with a body, and a plurality of trucks, of means associated with said body and directly coöperating in common with said trucks for determining the relative longitudinal position thereof.

16. In a vehicle, the combination with a body, and a plurality of trucks, of means constituting a rigid part of said body and disposed in substantially the middle thereof for restraining longitudinal movement of said trucks.

17. In a vehicle, the combination with a body, and a plurality of trucks, of means rigidly associated with the middle portion of said body for coöperating with said trucks to determine the position thereof.

18. In a vehicle, the combination with a body, and a plurality of driving trucks having end bumpers, of common means associated with said body and adapted to coöperate with the adjacent bumpers of said trucks for receiving the driving effort of said driving trucks.

19. The combination with a vehicle body and a driving truck, of means associated with said body and engaging an end of said truck for receiving the entire driving effort of said truck.

20. The combination with a vehicle body and a longitudinally movable driving truck having an end bumper, of a member rigidly secured to said body and adapted to engage said end bumper for transmitting the entire driving effort of said truck to said body.

21. The combination with a vehicle body and a driving truck loosely associated with said body in a longitudinal direction, of means associated with said body for transmitting the driving effort of said truck to said body only in one direction of travel.

22. In a vehicle, the combination with a body and a plurality of driving trucks, of means associated with said body and adapted to coöperate with said trucks for directly transmitting the driving effort of one of said trucks to said body in one direction of travel and of the other of said trucks in the opposite direction of travel.

23. The combination with a vehicle body and a plurality of driving trucks unrestrained in a longitudinal direction, of connecting means between said trucks, and means associated with said body for engaging the one or the other of said trucks and transmitting the driving effort thereof to said body.

24. The combination with a vehicle body and a plurality of swiveling driving trucks having curved end bumpers, said trucks being unrestrained in a longitudinal direction, of a linkage connection between adjacent bumpers and means associated with said body and adapted to engage said curved end bumpers for transmitting the driving effort of said trucks to said body and restraining said trucks.

25. In a vehicle, the combination with a body and a relatively movable truck, of means associated with the body and coöperating with the sides of said truck for determining its transverse position.

26. In a vehicle, the combination with a body and a relatively movable truck, of positioning means coöperating with the respective sides of said truck.

27. In a vehicle, the combination with a body and a relatively movable truck, of lateral restraining members associated with said body and coöperating with the sides of said trucks.

28. In a vehicle, the combination with a body and a truck, of a driving motor centrally located upon said truck, and means coöperating with the sides of said truck for restraining said truck laterally and permitting longitudinal and swiveling movements thereof.

29. In a vehicle, the combination with a body and trucks, of means for laterally restraining said trucks and permitting longitudinal and swiveling movements thereof.

30. In a vehicle, the combination with a body and trucks, of means engaging the sides of said trucks at substantially their mid-points for laterally restraining said trucks and permitting longitudinal and swiveling movements thereof.

31. In a vehicle, the combination with a body and trucks having side bearing members, of coöperating bearing members associated with said body and engaging the truck bearing members.

In testimony whereof, I have hereunto subscribed my name this 17th day of Feb. 1911.

GEORGE M. EATON.

Witnesses:
G. H. F. HOLY,
B. B. HINES.

It is hereby certified that in Letters Patent No. 1,155,225, granted September 28, 1915, upon the application of George M. Eaton, of Wilkinsburg, Pennsylvania, for an improvement in "Electric Locomotives," an error appears in the printed specification requiring correction as follows: Page 3, line 28, claim 12, for the word "and" read *to said;* and that the said Letters Patent should be read with this correction therein that the same may conform to the record of the case in the Patent Office.

Signed and sealed this 2nd day of November, A. D., 1915.

[SEAL.]

R. F. WHITEHEAD.

*Acting Commissioner of Patents.*